United States Patent [19]

Woller et al.

[11] Patent Number: 4,657,458
[45] Date of Patent: Apr. 14, 1987

[54] ANCHOR NUT FOR THREADED MEMBER

[75] Inventors: Burnell J. Woller, Barrington; Arthur J. Danko, Oaklawn, both of Ill.

[73] Assignee: Phillips Plastics Corporation, Phillips, Wis.

[21] Appl. No.: 883,458

[22] Filed: Jul. 8, 1986

Related U.S. Application Data

[63] Continuation of Ser. No. 549,295, Nov. 7, 1983, abandoned, which is a continuation-in-part of Ser. No. 343,893, Jan. 29, 1982, abandoned.

[51] Int. Cl.⁴ .................... F16B 37/02; F16B 37/10
[52] U.S. Cl. ................................ 411/182; 411/64; 411/433; 411/437; 411/913
[58] Field of Search .............. 411/15, 57, 60, 61, 411/63, 64, 68, 182, 432, 433, 434, 436, 437, 508, 913; 24/297, 662

[56] References Cited

U.S. PATENT DOCUMENTS

| | | | |
|---|---|---|---|
| 2,379,786 | 7/1945 | Bugg et al. | 411/57 |
| 2,393,606 | 1/1946 | Brush | 411/57 |
| 2,785,726 | 3/1957 | Brush. | |
| 2,788,047 | 4/1957 | Rapata | 411/182 |
| 2,946,612 | 7/1960 | Ahlgren | 411/913 X |
| 3,172,603 | 3/1965 | Bell et al. | 411/432 |
| 3,393,431 | 7/1968 | Saunders | 411/508 |
| 3,449,799 | 6/1969 | Bien | 411/437 |
| 3,469,493 | 9/1969 | Fisher | 411/913 X |
| 3,508,593 | 4/1970 | Gill. | |
| 3,693,494 | 9/1972 | Meyer | 411/508 |
| 3,741,067 | 6/1973 | Moran. | |
| 3,789,724 | 2/1974 | Moran | 411/432 |
| 3,905,270 | 9/1975 | Hehl | 411/913 X |
| 4,077,300 | 3/1978 | Yoda | 411/15 |
| 4,133,246 | 1/1979 | Small | 411/15 |
| 4,284,378 | 8/1981 | Mizusawa | 411/21 |
| 4,358,234 | 11/1982 | Takegawa et al. | 411/182 |

FOREIGN PATENT DOCUMENTS

| | | | |
|---|---|---|---|
| 948975 | 6/1974 | Canada | 411/433 |
| 970263 | 7/1975 | Canada | 411/61 |
| 2546831 | 4/1977 | Fed. Rep. of Germany | 411/433 |
| 1211073 | 10/1959 | France | 411/508 |
| 319871 | 4/1975 | Switzerland | 411/61 |
| 923034 | 4/1963 | United Kingdom | 411/432 |

Primary Examiner—Thomas J. Holko
Attorney, Agent, or Firm—James E. Nilles; Thomas F. Kirby

[57] ABSTRACT

A one-piece molded plastic reusable internally threaded anchor nut removably insertable in a mounting hole in a workpiece and adapted to receive a screw comprises two sections which are joined together by an integrally formed web or hinge. When the sections are folded together, they define an internally threaded screw-receiving passage and an external releasable locking mechanism for securing the anchor nut in the mounting hole. In one embodiment the portions defining the screw-receiving passage are bifurcated and expand outwardly as the screw is inserted so as to cause the external locking mechanism (i.e., in the form of slots on the exterior of the bifurcations) to engage the edge of the mounting hole in which the nut was previously inserted. In other embodiments, the external locking mechanism (i.e., in the form of manually depressible flexible projections or tabs) operates independently of screw insertion and the anchor nut with the screw already disposed therein is insertable into or removable from the mounting hole when the projections are depressed.

2 Claims, 21 Drawing Figures

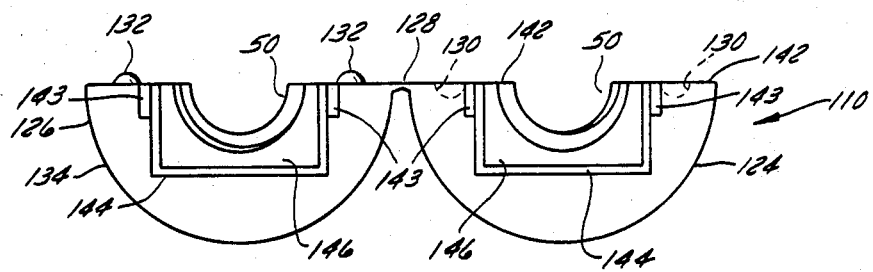
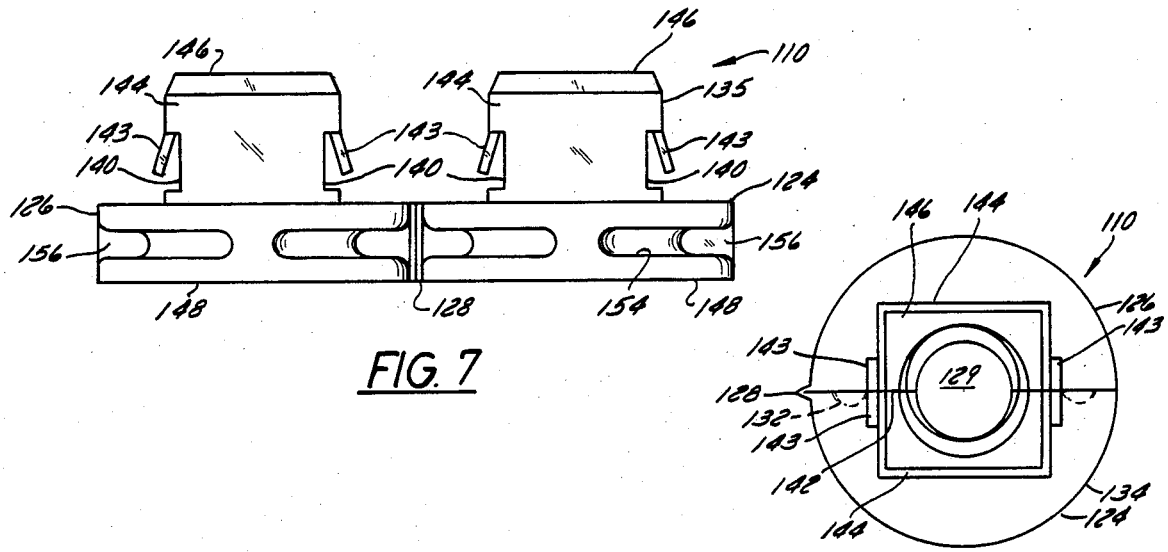
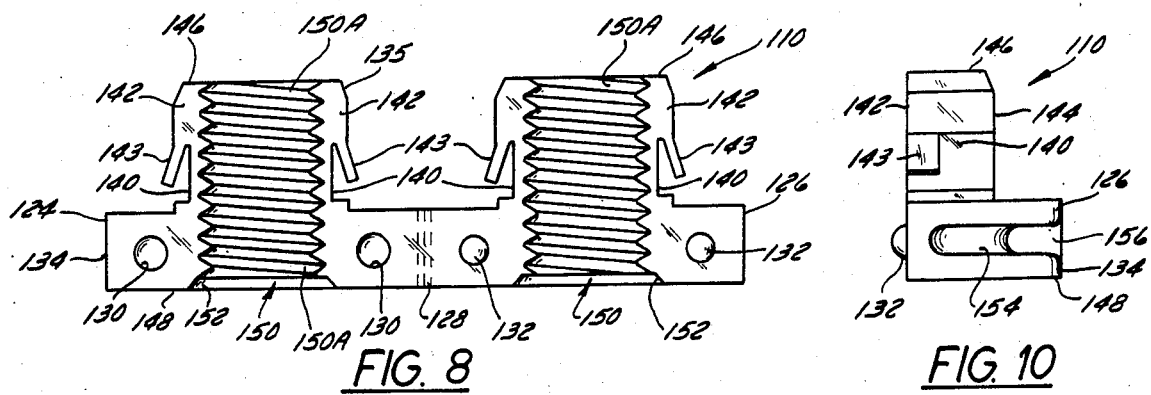
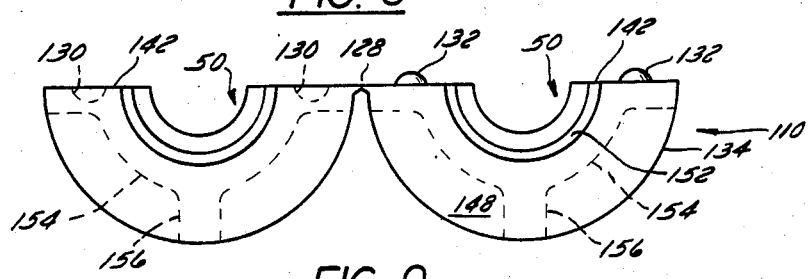

ANCHOR NUT FOR THREADED MEMBER

This application is a continuation of application Ser. No. 549,295, filed Nov. 7, 1983, now abandoned, which is a continuation-in-part of application U.S. Ser. No. 343,893 filed Jan. 29, 1982 and now abandoned.

BACKGROUND OF THE INVENTION

1. Field of Use

This invention relates generally to a one-piece molded plastic anchor nut for insertion in a mounting hole in a workpiece and adapted to receive a screw or other threaded member, such as a threaded adjustable mounting foot for an object, such as a domestic appliance or piece of furniture or the like.

2. Description of the Prior Art

Various types of anchor nuts of the aforedescribed general character are known and in use and the following U.S. and foreign patents illustrate the state of the art: U.S. Pat. No. 4,284,378; U.S. Pat. No. 3,741,067; U.S. Pat. No. 3,508,593; U.S. Pat. No. 2,785,726; U.S. Pat. No. 3,789,724; U.S. Pat. No. 4,358,234; U.S. Pat. No. 4,077,300; U.S. Pat. No. 3,449,799; German 25 46 831; Swiss 319871. U.S. Pat. No. 3,508,593 discloses a nut having a bore in which threads are tapped or cut as a screw is driven thereinto. U.S. Pat. No. 4,284,378 discloses a nut which comprises integrally formed foldable component parts which cooperate to define the nut and in which a screw-receiving bore is provided in which threads appear to be cut as a screw is inserted. U.S. Pat. No. 3,741,067 discloses a fastening assembly comprising a pair of complementary plastic nut-halves which are joined to a threaded member by webs. In use, the nut-halves are folded around the screw and the assembly is inserted into a mounting hole in a workpiece, whereupon initial rotation of the screw effects severance of the webs and allows the screw to be positioned as desired. U.S. Pat. No. 2,785,726 discloses one version wherein an expanded insert adapted for insertion into a hole in a panel has a plurality of outwardly movable legs which define a threaded bore for engagement with a free-running screw.

U.S. Pat. No. 3,789,724 discloses a foldable nut in which the inner surface of each foldable section includes molded depression, including threaded and unthreaded portions, and a pair of integrally molded loops which are threaded on the inside surface thereof. Furthermore, the latching means which retain the nut in a hole in a workpiece include projection on two opposite sides and each projection extends the entire width of the nut shank. A slot is disposed between the nut bore and the projection and also extends the entire width of the nut shank. U.S. Pat. No. 4,358,234 discloses a one-piece non-foldable initially unthreaded retaining clip. U.S. Pat. No. 4,077,300 discloses a one-piece non-foldable initially unthreaded grommet. U.S. Pat. No. 3,449,799 discloses a one-piece non-foldable fastener with a tapered bore and screw-expandable legs. German Pat. No. 25 46 831 discloses a metal nut formed in two halves and apparently held together by a sleeve. Swiss Pat. No. 319871 discloses a non-reusable multi-section foldable soft-metal plate which folds to define an anchor nut which expands when a screw is inserted therein.

The prior art also discloses an arrangement wherein metal anchor nuts in the form of "weldnuts" (TM) are spot-welded to the frame of an object, such as an appliance or piece of furniture, thus providing a threaded hole into which a metal foot having a threaded shank is power driven. The mounting feet are adjustable and are used to level the object when in use as well as in some instances to secure the object to a shipping pallet during shipping. In some instances, however, the feet are not used to mount the object on the pallet during shipping, but instead are merely screwed up out of the way against the anchor nut. Installation of anchor nuts by welding has always been a problem and often results in a high reject rate that is very costly. In addition, when the threaded foot is power driven into the nut, rejects occur due to stripped and damaged threads, if the threaded foot is not in exact alignment with the nut. It is desirable, therefore, to directly replace such weldnuts by anchor nuts not requiring a welding operation or a power driving operation that results in so many rejects.

At present there are some plastic fasteners or anchor nuts available that overcome some of the above problems but they are costly due to either a need for a secondary tapping operation to provide threads therein, or due to a weaker part having lesser thread engagement than is desirable because of the special construction.

SUMMARY OF THE PRESENT INVENTION

In accordance with the present invention there is provided a one-piece molded plastic reusable internally threaded anchor nut removably insertable in a mounting hole in a workpiece and adapted to receive a threaded member such as a screw or an adjustable mounting foot having a threaded shank. The anchor nut comprise first and second sections or nut-halves which are connected together by integrally formed web or hinge means which enable the two sections to be swung together or folded so as to define a finished nut ready for insertion in a mounting hole and having a threaded bore for receiving a threaded member. The exterior of the nut is provided with releasable locking means whereby the nut is releasably secured in the mounting hole.

Each of the two sections forming the nut has a pair of longitudinally spaced apart ends and an inside and outside surface. Each inside surface has a depression molded therein which extends between the aforesaid ends. The depression is provided with integrally formed screw threads therein which confront each other and cooperate when the sections are folded to define a threaded bore for engaging the screw insertable in the bore. The outside surface of at least one section is provided with an abutment, projection or flange which serves as the head of the nut. The outside surface of at least one section, but preferably both sections, has a movable latching or locking mechanism formed thereon for engagement with an edge of the hole in the panel into which the nut is inserted and such member serves as the aforementioned releasable locking means.

In one embodiment the shank wall adjacent the threaded depression in each section is slotted so as to provide flexible bifurcations or legs which expand outwardly as the screw is inserted in the bore. Such expansion causes the locking mechanism, in the form of a notch on the exterior of the leg, to engage the edge of the hole which the nut was previously inserted.

In use, the nut of the said one embodiment is folded from molded to assembled position and snapped into the mounting hole. The screw member is then screwed into the anchor nut. When assembled, the legs of the anchor nut flare out to securely lock it into position in the mounting hole.

In other embodiments wherein the nut shank wall is not slotted, the locking mechanism takes the form of flexible outwardly biased manually depressible projections or tabs which move independent of bolt insertion. Such a nut with or without a bolt already screwed or emplaced therein in insertable into and removable from the mounting hole in the workpiece.

In use, the screw is, for example, prepositioned in the anchor nut before assembly and the nut-halves are then folded over and the two-piece assembly (anchor nut and screw) is snapped in the mounting hole. However, the nut can be inserted without the screw being positioned therein.

An anchor nut in accordance with the present invention offers numerous advantages over the prior art. For example, the nut is molded in one piece comprising two hinged sections which are foldable to define a threaded bore. Each section comprises a substantially flat inner face in which a depression is molded. As a result of such a construction, threads can be molded into the depression in each nut-half thereby eliminating the need for a secondary or additional thread tapping operation or the construction of complex molds such as U.S. Pat. No. 3,789,724 requires. The threaded bore, which extends entirely through the nut (or may extend only partially therethrough in some embodiments) is threaded for substantially its entire length and the threads are uniformly and evenly distributed around all sides of the bore, thus ensuring that the threaded member makes solid, even and uniform engagement with the threads in the nut so that axial forces are evenly distributed and any tendency for the threaded member to tear out of the threaded bore or to skew or damage the nut is substantially reduced or eliminated. Furthermore, the locking mechanisms are constructed so that flexible movement of the locking projections or tabs is readily possible, yet a maximum amount of plastic material is retained in the shank wall adjacent the threaded bore thereby adding to the strength and ruggedness of the retaining nut. Also, the dies and molds needed for the embodiments disclosed herein are substantially more simple and less costly than those required in prior art nuts of complex configuration. The aforesaid factors substantially reduce the cost of manufacture of the anchor nut yet enhance its strength. Furthermore, in some embodiments of the invention disclosed herein, an assembly comprising an anchor nut with a screw already emplaced therein can be inserted directly into a mounting hole. In the latter embodiments, the screw may be emplaced by folding the nut-halves thereover. Or, if preferred, the screw may be driven into the already folded nut-halves after the nut is emplaced in the mounting hole. The latching means for the several embodiments are integrally formed on the exterior of the molding. Other objects and advantages of the invention will hereinafter appear.

DRAWINGS

FIG. 6 is a top plan view of an anchor nut in accordance with the second embodiment of the present invention and showing the nut as it appears immediately after manufacturing but prior to folded final assembly;

FIG. 7 is a rear elevation view of the nut of FIG. 6;

FIG. 8 is a front elevation view of the nut of FIGS. 6 and 7;

FIG. 9 is a bottom plan view of the nut of FIGS. 6, 7 and 8;

FIG. 10 is an end elevation view of the nut of FIGS. 6 through 9;

FIG. 11 is a top plan view showing the nut of FIGS. 6–10 folded into final assembled condition;

DESCRIPTION OF PREFERRED EMBODIMENTS

First Embodiment

Figure 13:
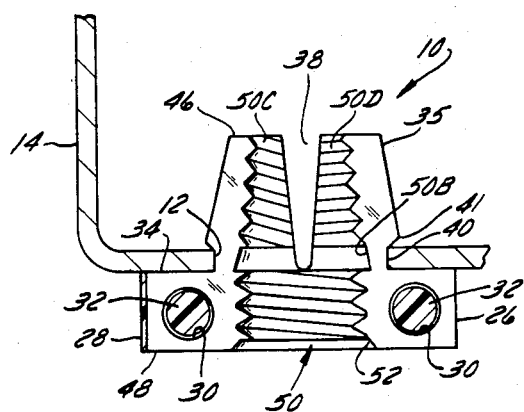
FIG. 13 is a cross-sectional view of an assembled nut in accordance with the first embodiment of the invention shown in FIGS. 1–5, and showing it inserted in a hole in a panel in an appliance.
Figure 14:
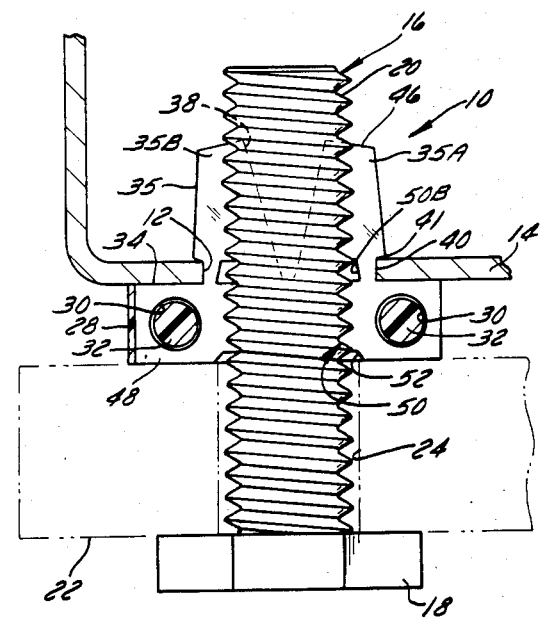
FIG. 14 is a view similar to FIG. 13 but shows the nut also having a threaded screw foot in association therewith, such screw foot extending through a pallet.
Figure 16:
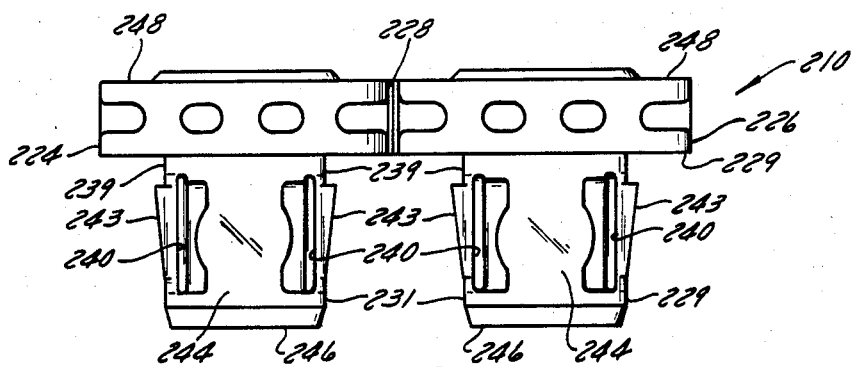
FIG. 16 is a rear elevation view of the nut of FIG. 15.
Figure 15:
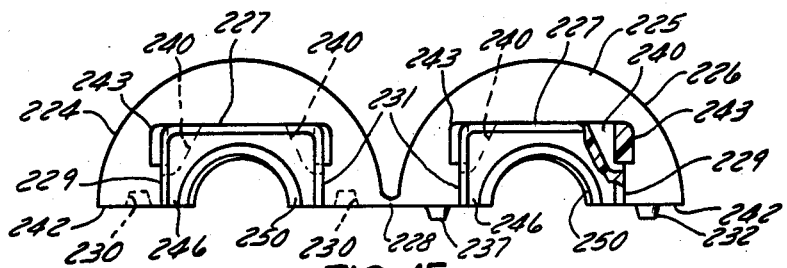
FIG. 15 is a top plan view of an anchor nut in accordance with the third embodiment of the present invention and showing the nut as it appears immediately after manufacturing but prior to folded final assembly.

FIGS. 1 through 5 and 13 and 14 depict an anchor nut 10 in accordance with a first embodiment of the present invention. FIGS. 13 and 14 show nut 10 inserted through and in locked engagement with the edge of a mounting hole 12 of rectangular (square) configuration through the lower side of a workpiece 14 which, for example, may be a piece of sheetmetal forming part of the leg or bottom of an object such as a domestic appliance. FIG. 14 also shows nut 10 engaged by a threaded member, such as an adjustable mounting foot 16 having a head 18 and a threaded shank 20. In FIG. 14, a broken line 22 designates a pallet having a hole 24 therethrough through which mounting foot 16 extends to illustrate an arrangement wherein foot 16 secures the pallet against anchor nut 10 and to the bottom of the appliance for shipment. It is to be understood that pallet 22 could be omitted and foot 16 could be fully screwed into nut 10 so that head 18 bears against the nut and is out of the way during shipment.

Figure 5:
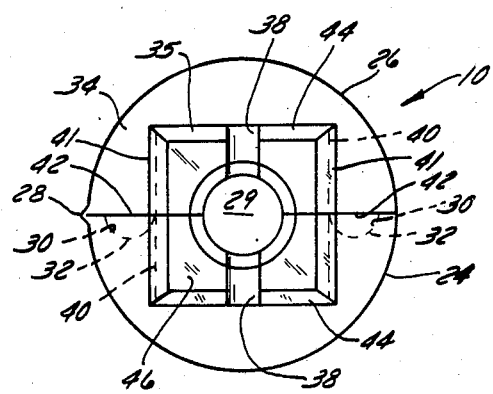
FIG. 5 is a top plan view showing the nut of FIGS. 1 through 4 folded into final assembled condition.

As FIGS. 1 through 5 show, anchor nut 10 comprises two sections or nut-halves 24, 26 which are connected together by a thin flexible web or hinge 28 which enables the two sections to be moved from the unfolded position (in which they are molded), shown in FIGS. 1 through 4, to the folded position ready for insertion, as shown in FIG. 5. When so folded, sections 24 and 26 define a screw-receiving bore 29, as FIG. 5 shows.

Nut sections 24 and 26 are mirror images of each other except that, for alignment purposes, section 24 comprises a pair of hemisperical indentations 30 for receiving a pair of hemispherical projections 32 on section 26. Since the sections 24 and 26 are substantially identical, only section 24 is hereinafter described in detail. Section 24 comprises a semi-cylindrical head portion 34 from which a rectangular tapered shank portion 35 extends. Shank portion 35 is divided by a wedge-shaped slot 38 into resiliently movable bifurcations or legs 35A and 35B which can be flexed, as hereinafter explained, in the direction of the arrow A in FIG. 2.

Shank portion 35 is provided with two slots or grooves 40 on opposite sides thereof in the region where shank portion 35 joins head portion 34 and these grooves 40 and adjacent shoulders 41 serve as a locking or latching means for gripping the edge of the hole 12 in workpiece 14, as FIGS. 13 and 14 show.

Figure 1:
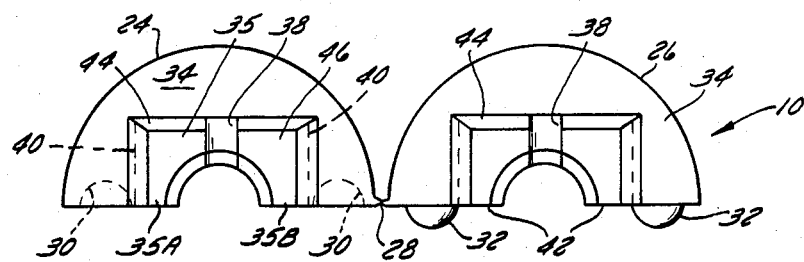
FIG. 1 is a top plan view of an anchor nut in accordance with the first embodiment of the present invention and showing the nut as it appears immediately after manufacturing but prior to folded final assembly.
Figure 2:
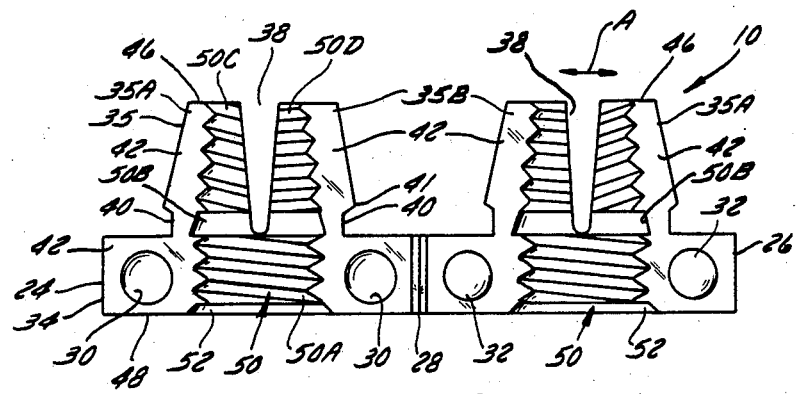
FIG. 2 is a front elevation view of the nut of FIG. 1.
Figure 3:
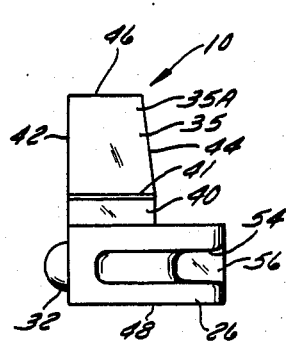
FIG. 3 is an end elevation view of the nut of FIGS. 1 and 2.
Figure 4:
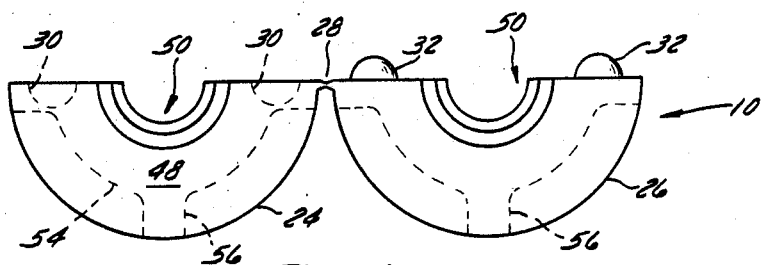
FIG. 4 is a bottom plan view of the nut of FIGS. 1, 2 and 3.

Section 24 of anchor nut 10 comprises inside and outside surfaces 42 and 44, respectively, and also comprises top and bottom surfaces 46 and 48, respectively. Inside surface 42 is provided with a nearly semi-cylindrical indentation or depression 50 which extends between and through top surface 46 and bottom surface 48. Depression 50 is divided into four regions, as follows, as shown in FIG. 2: a threaded head region 50A, an unthreaded intermediate region 50B, a threaded region 50C on leg 35A, and a threaded region 50D on leg 35B. Prior to insertion of screw 16, the legs 35A and 35B and the threaded regions have the relationship shown in FIG. 2, but after screw insertion the legs 35A and 35B flex outwardly to the position shown in FIG. 14 with the following effect: the shoulders 41 of the grooves 40 more firmly entrap or engage workpiece 14; the depression 50 assumes a substantially semi-cylindrical (although threaded) configuration; and the threaded regions 50C and 50D on legs 35A and 35B, respectively, align with the threaded head region 50A. The unthreaded intermediate region 50B allows for such threaded alignment. It is to be noted that the legs 35A and 35B of each section 24 and 26 are tapered inwardly toward each other, as FIG. 2 shows, when those legs are in relaxed condition and, therefore, the threads 50C and 50D on each leg 35A and 35B are also tapered toward each other and out of registry. The threads 50C and 50D become properly aligned when the end of screw 16, already engaged with the threads 50A, crosses the unthreaded intermediate region 50B and starts to engage the threads 50C and 50D but, before being able to do so, first causes the legs 35A and 35B to spread apart.

The insertion end of depression 50 is provided with a chamfered surface 52 to facilitate screw insertion into the bore 29 defined by the two mating depressions 50. The head portion 34 of nut section 24 is provided with recesses 54 separated by walls 56 which extend inwardly (see FIGS. 3 and 4) which reduce the amount of plastic material required to fabricate the nut without sacrificing rigidity or strength.

Operation

Anchor nut 10 is employed as follows. Assume initially that nut 10 is disposed as shown in FIGS. 1 through 4. The nut-halves or sections 24 and 26 are then swung toward each other on hinge 28 until they assume the condition shown in FIG. 5. Proper mating and alignment of the sections 24 and 26 is accomplished by engagement of the projections 32 with the indentations 30. In this condition, the shank portion 35 of nut 10 is inserted into and through mounting hole 12 in workpiece 14, as FIG. 13 shows. The wedge-shaped slots 38 allow the pair of legs 35A and the pair of legs 35B to move toward each other as tapered shank portion 35 is pushed into mounting hole 12. Thus, the distance between the pair of shoulders 41 is reduced sufficiently to enable the shoulders to move through hole 12, whereupon the pairs of legs 35A and 35B spring outwardly to the position shown in FIG. 13. This enables the opposite edges of the workpiece 14 adjacent hole 12 to engage the grooves 40 in locking relationship.

At this point, the threaded member or screw 16 is screwed into that portion of bore 29 defined by the two mating threaded head regions 50A of the head portions 34 of the sections 24 and 26. The lead end of screw 16 then traverses the unthreaded section of bore 29 defined by the mating pair of unthreaded intermediate regions 50B. The lead end of screw 16 engages four tapered threaded regions 50C and 50D and by forcing apart the pair of legs 35A and the pair of legs 35B in the outward direction causes the screw threads on the four legs 35A and 35B to become properly aligned with each other and with the screw 16, as FIG. 14 shows. Screw 16 is driven into anchor nut 10 to whatever extent is necessary or desirable. When screw 16 is in place, anchor nut 10 cannot be withdrawn from hole 12 in workpiece 14 because of the fact that the semi-cylindrical head portions 34 bear against one side of workpiece 14 and the shoulders 41 bear against the opposite side of the workpiece, as FIG. 14 shows. However, if screw 16 is unscrewed from anchor nut 10, either completely or at least to the point where threaded screw shank 20 is disengaged from the four threaded regions 50C and 50D, then the pairs of legs 35A and 35B move toward each other to the position shown in FIG. 13 and can then be squeezed even closer together manually until the distance between the shoulders 41 is less than the diameter of hole 12 in the same direction, whereupon nut 10 can be withdrawn from hole 12. After withdrawal, anchor nut 10 tends to resume the unfolded condition shown in FIGS. 1 through 4.

Second Embodiment

Figure 12:
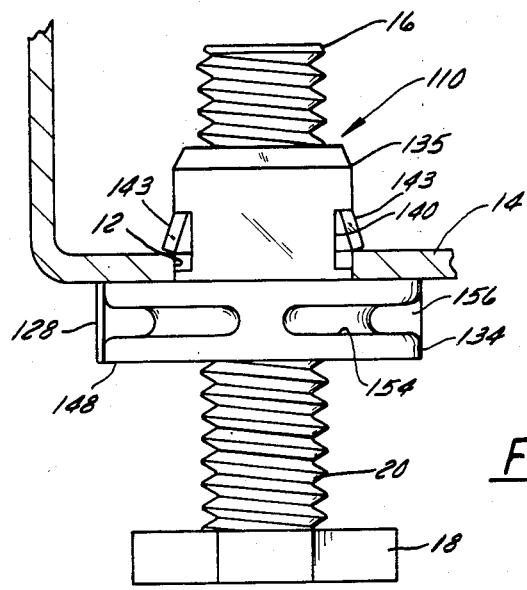
FIG. 12 is a side elevation view, partly in cross section, of the assembled nut in accordance with the second embodiment of the invention shown in FIGS. 6–11 and showing it secured in a hole in a panel of an appliance and further showing it having a threaded screw foot associated therewith.

FIGS. 6 through 12 depict an anchor nut 110 in accordance with a second embodiment of the present invention. FIG. 12 shows nut 110 inserted through and in locked engagement with the edge of a mounting hole 12 of rectangular (square) configuration through the lower side of workpiece 14.

As FIGS. 6 through 12 show, anchor nut 110 comprises two sections or nut-halves 124, 126 which are connected together by a thin flexible web or hinge 128 which enables the two sections to be moved from the unfolded position (in which they are molded), shown in FIGS. 6 through 10, to the folded position ready for insertion, as shown in FIG. 11. When so folded, sections 124 and 126 define a screw-receiving bore 129, as FIG. 11 shows.

Nut sections 124 and 126 are mirror images of each other except that, for alignment purposes, section 124 comprises a pair of hemispherical indentations 130 for receiving a pair of hemispherical projections 132 on section 126. Since the sections 124 and 126 are substantially identical, only section 124 is hereinafter described in detail. Section 124 comprises a semi-cylindrical head portion 134 from which a rectangular shank portion 135 extends.

Shank portion 135 is provided with two slots or grooves 140 on two opposite sides thereof intermediate the ends of shank portion 135. These grooves 140 accommodate resilient movable or flexible tabs 143 which serve as a locking or latching means for gripping the edge of the hole 12 in workpiece 14, as FIG. 12 shows. Each tab 143 is integrally formed with shank portion 135 and extends outwardly therefrom.

Section 124 of anchor nut 110 comprises inside and outside surfaces 142 and 144, respectively, and also comprises top and bottom surfaces 146 and 148, respectively. Inside surface 142 is provided with a semi-cylindrical indentation or depression 150 which extends between and through top surface 146 and bottom surface 148 and which is provided with a threaded head region 150A.

The insertion end of depression 150 is provided with a chamfered surface 152 to facilitate screw insertion into the bore 129 defined by the two mating depressions 150. The head portions 134 of nut sections 124 is provided with recesses 154 separated by walls 156 which extend inwardly (see FIGS. 7, 9 and 10) which reduce the amount of plastic material required to fabricate the nut without sacrificing rigidity or strength.

Operation

Anchor nut 110 is employed in either one of two ways as follows. Assume initially that nut 110 is disposed as shown in FIGS. 6 through 10. In the first manner of usage the nut-halves or sections 124 and 126 are then swung toward each other on hinge 128 until they assume the condition shown in FIG. 11. Proper mating and alignment of the sections 124 and 126 is accomplished by engagement of the projections 132 with the indentations 130. In this condition, the shank portion 135 of nut 110 is inserted into and through mounting hole 12 in workpiece 14, as FIG. 12 shows. The tabs 143 move toward each other into the grooves 140 as shank portion 135 is pushed into mounting hole 12. Thus, the distance between the outside surfaces of the pair of tabs 143 is reduced sufficiently to enable the shank to move through hole 12, whereupon the pair of tabs 143 spring outwardly to the position shown in FIG. 12. This enables the opposite edges of the workpiece 14 adjacent hole 12 to engage the shoulders 141 in locking relationship.

At this point, the threaded member or screw 16 is screwed into threaded bore 129. Screw 16 is driven into anchor nut 110 to whatever extent is necessary or desirable.

In the second manner of usage hereinbefore referred to, the nut-halves 124 and 126 are folded around the threaded shank 20 of screw 16 at some preferred location and the anchor nut 110 with the screw 16 already in place therein is inserted into hole 12 in the same manner as hereinbefore described.

Anchor nut 110 cannot be withdrawn from hole 12 in workpiece 14 because of the fact that the semi-cylindrical head portions 134 bear against one side of workpiece 14 and the tabs 143 bear against the opposite side of the workpiece, as FIG. 12 shows. However, the tabs 143 can be squeezed closer together manually into the grooves 140 whereupon nut 110 can be withdrawn from hole 12. After withdrawal, anchor nut 110 tends to resume the unfolded condition shown in FIGS. 6 through 10.

Third Embodiment

Figure 20:
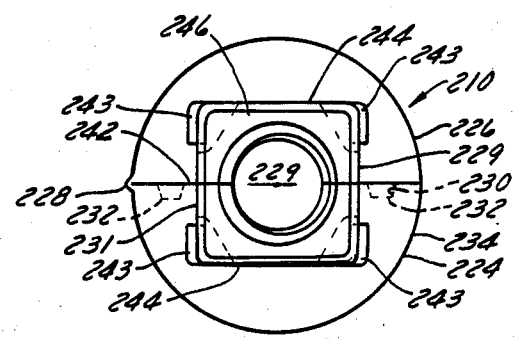
FIG. 20 is a top plan view showing the nut of FIGS. 15–19 folded into final assembled condition.
Figure 21:
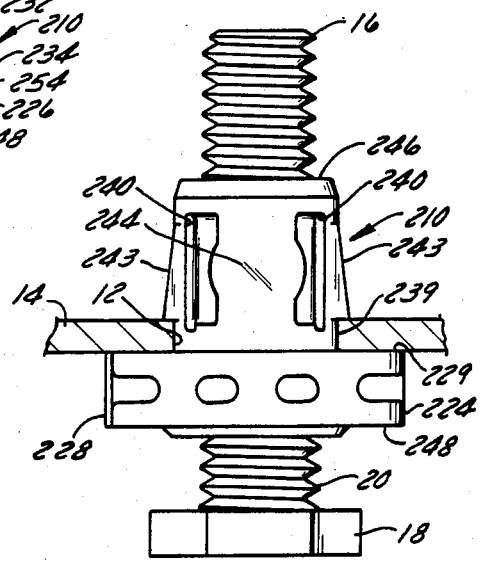
FIG. 21 is a side elevation view, partly in cross section, of the assembled nut in accordance with the third embodiment of the invention shown in FIGS. 15 through 20 and showing it secured in a hole in a panel of an appliance and further showing it having a threaded screw foot associated therewith.

FIGS. 15 through 21 depict an anchor nut 210 in accordance with a third embodiment of the present invention. FIG. 21 shows nut 210 inserted through an in lock engagement with the edge of a mounting hole 12 of rectangular (square) configuration through the lower side of workpiece 14.

As FIGS. 15 through 21 show, anchor nut 210 comprises two sections or nut-halves 224, 226 which are connected together by a thin flexible web or hinge 228 which enables the two sections to be moved from the unfolded position (in which they are molded), shown in FIGS. 15 through 18, to the folded position ready for insertion, as shown in FIG. 20. When so folded, sections 224 and 226 defined a screw-receiving bore 229, as FIG. 20 shows. Web 228 is non-frangible.

Nut sections 224 and 226 are mirror images of each other except that, for alignment purposes, section 224 comprises a pair of hemispherical indentations 230 for receiving a pair of hemispherical projections 232 on section 226. Since the sections 224 and 226 are substantially identical, only section 224 is hereinafter described in detail. Section 224 comprises a semi-cylindrical head portion 234 from which a rectangular shank portion 235 extends.

Section 224 of anchor nut 210 comprises inside and outside surfaces 242 and 244, respectively, and also comprises top and bottom surfaces 246 and 248, respectively. Inside surface 242 is provided with a semi-cylindrical indentation or depression 250 which extends between and through top surface 246 and bottom surface 248 and which is provided with a threaded region 250A.

The head portion 234 includes an undersurface 225 and the shank portion 235 includes an outerface 227, a first side face 229 and a second side face 231. Each side face 229, 231 has a width W (see FIG. 19) and each side face has an integrally formed tab or projection 243 thereon which extends outwardly from its respective side face and serves as a locking or latching means for gripping the edge of the hole 12 in workpiece 14, as FIG. 21 shows. Each projection 243, which slopes outwardly proceeding from its respective side face 229, 231 in a direction toward undersurface 225 of head portion 234 and terminates short of undersurface 225 so as to provide a groove 239 for receiving the hole edge, extends only about one-half the width W (W/2) across its respective side face 229, 231. Furthermore, shank portion 235 is provided with a slot or groove 240 which extends inwardly from outer face 227 for a depth slightly greater than the width of its associated projection 243 and exits at side face 229. Slot 240 is preferably slightly longer than the associated projection 243 and has a width which is preferably slightly deeper than the maximum distance which the associated projection 243 extends from its respective side face 229, 231 at its widest point. This enables the projection 243 to be fully depressed during insertion into or removal from hole 12 of anchor nut 210. This construction enables solid latching of nut 210 in hole 12, since each of the four projections 243 on nut 210 acts independently of the other. Furthermore, although four independent projections 243 are provided, this is done by using a minimum amount of plastic material and the maximum material is retained at the thinnest portion of the shank wall thereby resulting in a stronger anchor nut.

The insertion end of depression 250 is provided with a chamfered surface 252 to facilitate screw insertion into the bore 229 defined by the two mating depressions 250. The head portions 234 of nut section 224 is provided with recesses 254 separated by walls 256 which extend inwardly (See FIGS. 16, 18 and 19) which reduce the amount of plastic material required to fabricate the nut without sacrificing rigidity or strength.

Operation

Anchor nut 210 is employed in either one of two ways as follows. Assume initially that nut 210 is disposed as shown in FIGS. 15 through 19. In the first manner of usage the nut-halves or sections 224 and 226 are then swung toward each other on hinge 228 until they assume the condition shown in FIG. 20. Proper mating and alignment of the sections 224 and 226 is accomplished by engagement of the projections 232 with the indentations 230. In this condition, the shank portion 235 of nut 210 is inserted into and through mounting hole 12 in workpiece 14, as FIG. 21 shows. The tabs 243 move toward each other into the slots 240 as shank portion 235 is pushed into mounting hole 12. Thus, the distance between the outside surfaces of the pair of tabs 243 is reduced sufficiently to enable the shank to move through a hole 12, whereupon the pair of tabs 243 spring outwardly to the position shown in FIG. 18. This enables the opposite edges of a workpiece such as the workpiece 14 adjacent hole 12 to engage the shoulders 241 in locking relationship. At this point, the threaded member or screw 16 is screwed into threaded bore 229. Screw 16 is driven into anchor nut 210 to whatever extent is necessary or desirable.

In the second manner of usage hereinbefore referred to, the nut-halves 224 and 226 are folded around the threaded shank 20 of screw 16 at some preferred location and the anchor nut 210 with the screw 16 already in place therein is inserted into hole 12 in the same manner as hereinbefore described.

Anchor nut 210 cannot be withdrawn from hole 12 in workpiece 14 because of the fact that the semi-cylindrical head portions 234 bear against one side of workpiece 14 and the tabs 243 bear against the opposite side of the workpiece, as FIG. 21 shows. However, the tabs 243 can be squeezed closer together manually into the slots 240 whereupon nut 210 can be withdrawn from hole 12. After withdrawal, anchor nut 210 tends to resume the unfolded condition shown in FIGS. 15 through 19, ready for re-use.

Figure 17:
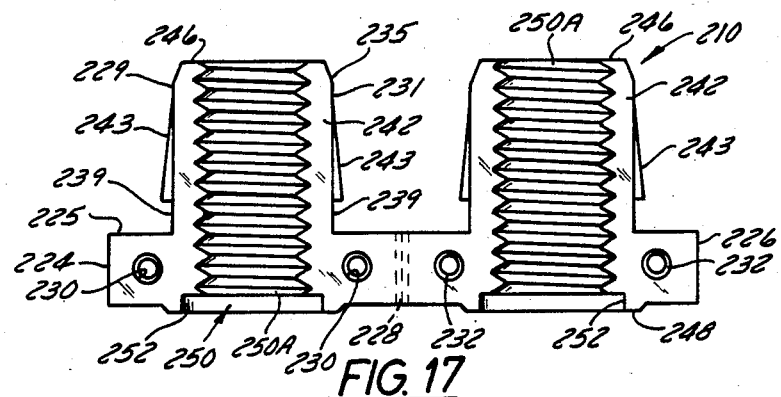
FIG. 17 is a front elevation view of the nut of FIGS. 15 and 16.
Figure 19:
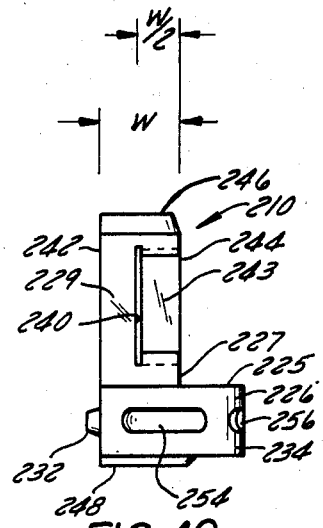
FIG. 19 is an end elevation view of the nut of FIGS. 15 through 18.
Figure 18:
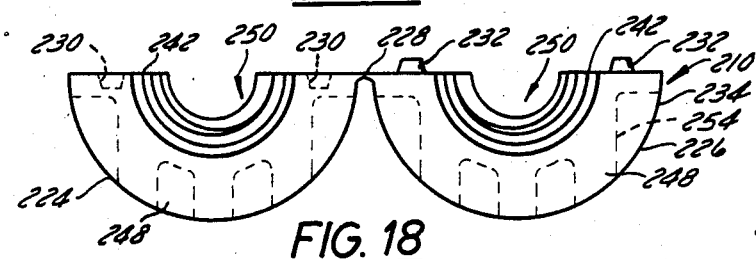
FIG. 18 is a bottom plan view of the nut of FIGS. 15, 16 and 17.

As seen in FIGS. 17 and 20, there is 100 percent thread engagement with shank 16 for the full length of nut 210.

We claim:

1. A one-piece reusable molded plastic anchor nut including a head and a shank for removable insertion in a hole in a workpiece and adapted to releasably receive an adjustably positionable threaded member in a threaded bore formed in said head and shank, said anchor nut comprising:

a first section including a head portion and a shank portion;

a second section including a head portion and a shank portion;

each section having opposite ends, a substantially flat inside surface and an outside surface, the outside surface of a head portion including an undersurface and the outside surface of a shank portion including an outer face and a pair of side faces, each side face having a predetermined width;

and a flexible non-frangible web connected to and between the head portions of said sections to enable said sections to be swung toward each other from a molded position to an assembled position;

said inside surfaces facing in the same direction when said sections are in said molded position and said inside surfaces confronting each other when said sections are in assembled position;

each inside surface having a depression therein extending from one end toward the opposite end of its section, said depression being threaded for substantially its entire length;

each inside surface having alignment means thereon which engage when said sections are folded into assembled position;

the undersurface of the head portion of each section being engageable with one side of said workpiece to prevent passage of the assembled anchor nut entirely through said hole in the workpiece;

each of side face of a shank portion of each section having releasable latching means formed thereon to prevent unintentional removal of said nut from said hole, said releasable latching means including a projection integrally connected at its opposite ends to said side face and extending outwardly from its respective side face and cooperating with the undersurface of the associated head portion to define a space for receiving an edge of said workpiece adjacent said hole which is releasably engageable with said edge, said projection being resiliently depressible toward a groove extending inwardly from said outer face of a respective shank portion and behind a side face and said projection thereon, the width of said projection and the width of the groove therebehind being about half the depth of the associated side face.

2. A one-piece reusable molded plastic anchor nut including a head and a shank for removable insertion in a hole in a workpiece and adapted to releasably receive an adjustably positionable threaded member in a theaded bore formed in said head and shank, said anchor nut comprising:

a first section including a head portion and a shank portion;

a second section including a head portion and a shank portion;

each section having opposite ends, a substantially flat inside surface and an outside surface, the outside surface of a head portion including an undersurface and the outside surface of a shank portion including an outer face and a pair of side faces;

and a flexible non-frangible web connected to and between the sides of the head portions of said sections to enable said sections to be swung toward each other from a molded position to an assembled position;

said inside surfaces facing in the same direction when said sections are in said molded position and said inside surfaces confronting each other when said sections are in assembled position;

each inside surface having a continuous depression therein extending from one end toward the opposite end of its section, said depression being threaded for substantially its entire length;

each inside surface having alignment means thereon which engage when said sections are folded into assembled position;

the undersurface of the head portion of each section being engageable with one side of said workpiece to prevent passage of the assembled anchor nut entirely through said hole in the workpiece;

each side face of a shank portion of each section having releasable latching means formed thereon to prevent unintentional removal of said nut from said hole, said releasable latching means including a projection extending outwardly from its respective side face and cooperating with the undersurface of the associated head portion to define a space for receiving an edge of said workpiece adjacent said hole which is releasably engageable with said edge, said projection being resiliently depressible toward a groove formed in said shank portion, said groove extending inwardly from said outer face of a respective shank portion and behind a side face and said projection being integrally connected at its opposite ends to said side face, the width of said projection and the width of the groove therebehind being about half the depth of the associated said side face.

* * * * *